(12) United States Patent
Takachi

(10) Patent No.: US 6,877,393 B2
(45) Date of Patent: Apr. 12, 2005

(54) HANDGRIP SHIFTER FOR A BICYCLE

(75) Inventor: Takeshi Takachi, Kawachinagano (JP)

(73) Assignee: Shimano, Inc., Sakai (JP)

( * ) Notice: Subject to any disclaimer, the term of this patent is extended or adjusted under 35 U.S.C. 154(b) by 0 days.

(21) Appl. No.: 10/754,383

(22) Filed: Jan. 8, 2004

(65) Prior Publication Data

US 2004/0139816 A1 Jul. 22, 2004

Related U.S. Application Data

(62) Division of application No. 10/117,026, filed on Apr. 4, 2002.

(51) Int. Cl.[7] .............................. F16C 1/10; G05G 1/08; B62K 25/02
(52) U.S. Cl. ......................... 74/502.2; 74/489; 74/505; 74/506; 74/473.14
(58) Field of Search ...................... 74/488, 489, 471 R, 74/505, 506, 141.5, 142, 473.14, 500.5, 502.6, 502.2

(56) References Cited

U.S. PATENT DOCUMENTS

| 4,938,733 | A | * | 7/1990 | Patterson ..................... 474/80 |
| 5,102,372 | A | | 4/1992 | Patterson et al. |
| 5,588,331 | A | * | 12/1996 | Huang et al. ................. 74/489 |
| 5,799,542 | A | | 9/1998 | Yamane |
| 5,823,058 | A | | 10/1998 | Arbeiter |
| 5,921,139 | A | | 7/1999 | Yamane |
| 6,067,875 | A | | 5/2000 | Ritchey et al. |
| 6,276,227 | B1 | | 8/2001 | Ose |
| 6,276,231 | B1 | | 8/2001 | Yamane |
| 6,595,894 | B1 | * | 7/2003 | Hanatani ..................... 475/349 |
| 6,718,844 | B1 | * | 4/2004 | Hanatani ................... 74/502.2 |

| 2001/0009116 | A1 | | 7/2001 | Wessel et al. |
| 2002/0134189 | A1 | | 9/2002 | Ose |

FOREIGN PATENT DOCUMENTS

| EP | 671318 | A2 | | 9/1995 | |
| EP | 768234 | A1 | | 4/1997 | |
| EP | 893336 | A2 | | 1/1999 | |
| EP | 001350715 | A2 | * | 10/2003 | .................. 74/489 |
| JP | 44-26571 | | | 11/1969 | |
| JP | 8-26174 | | * | 1/1996 | .................. 74/489 |

* cited by examiner

Primary Examiner—Vinh T. Luong
(74) Attorney, Agent, or Firm—James A. Deland

(57) ABSTRACT

A bicycle shift control device comprises a base member; an operating member structured to be mounted around a handlebar so as to rotate in first and second directions around the handlebar; a transmission control member coupled to the operating member and rotatably mounted relative to the base member for pulling and releasing a transmission control element; a first position setting member; a second position setting member structured to rotate with the operating member and to move axially, wherein the second position setting member moves between an engagement position in which the second position setting member engages the first position setting member and a disengagement position in which the second position setting member is disengaged from the first position setting member; a first coupling member that moves in response to rotation of the operating member; a second coupling member coupled to the second position setting member for engaging the first coupling member so that rotation of the operating member causes rotation of the second position setting member; and wherein the first coupling member and the second coupling member are structured so that rotation of the operating member rotates the transmission control member for a selected rotational distance without moving the second position setting member toward the disengagement position.

26 Claims, 14 Drawing Sheets

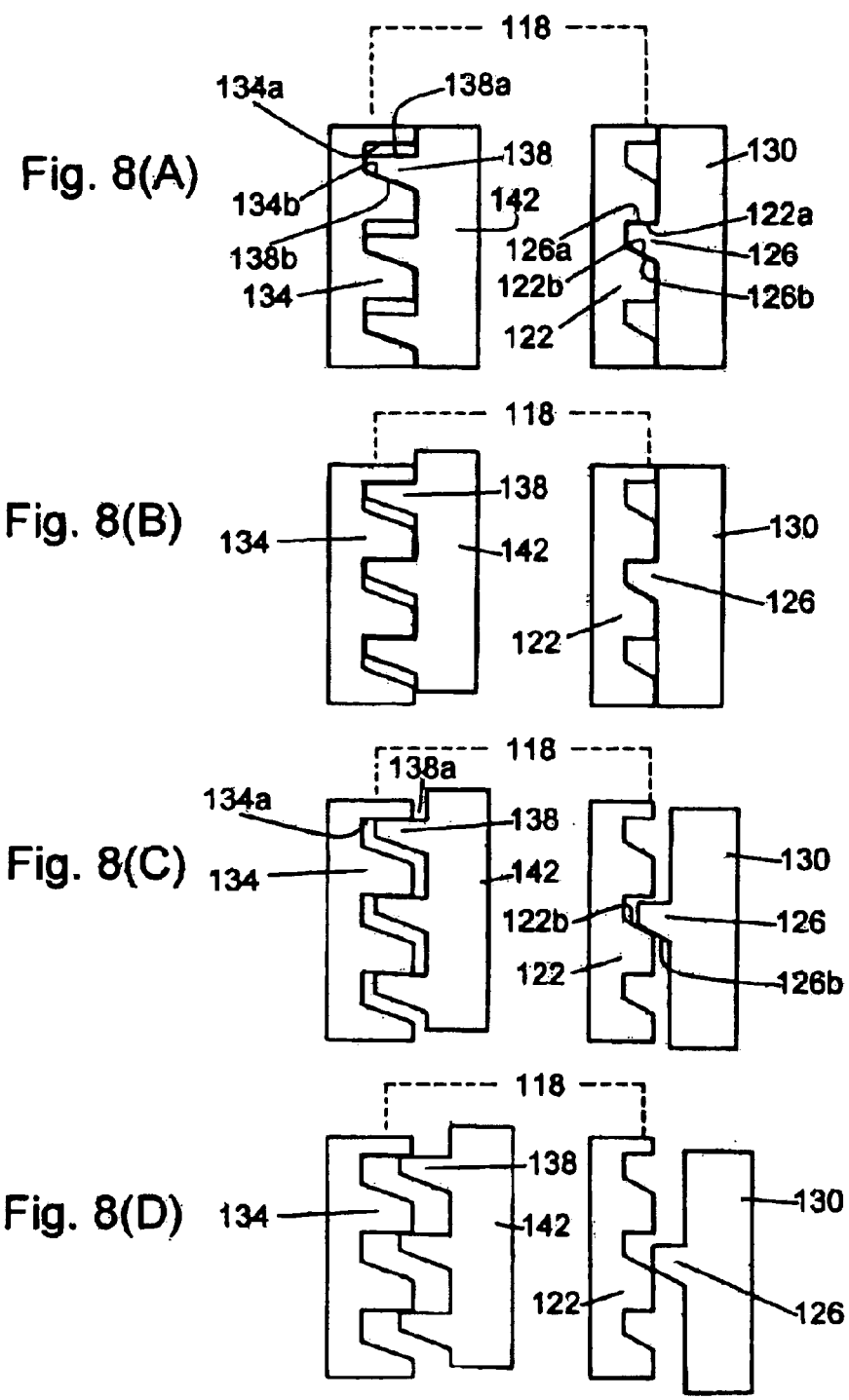

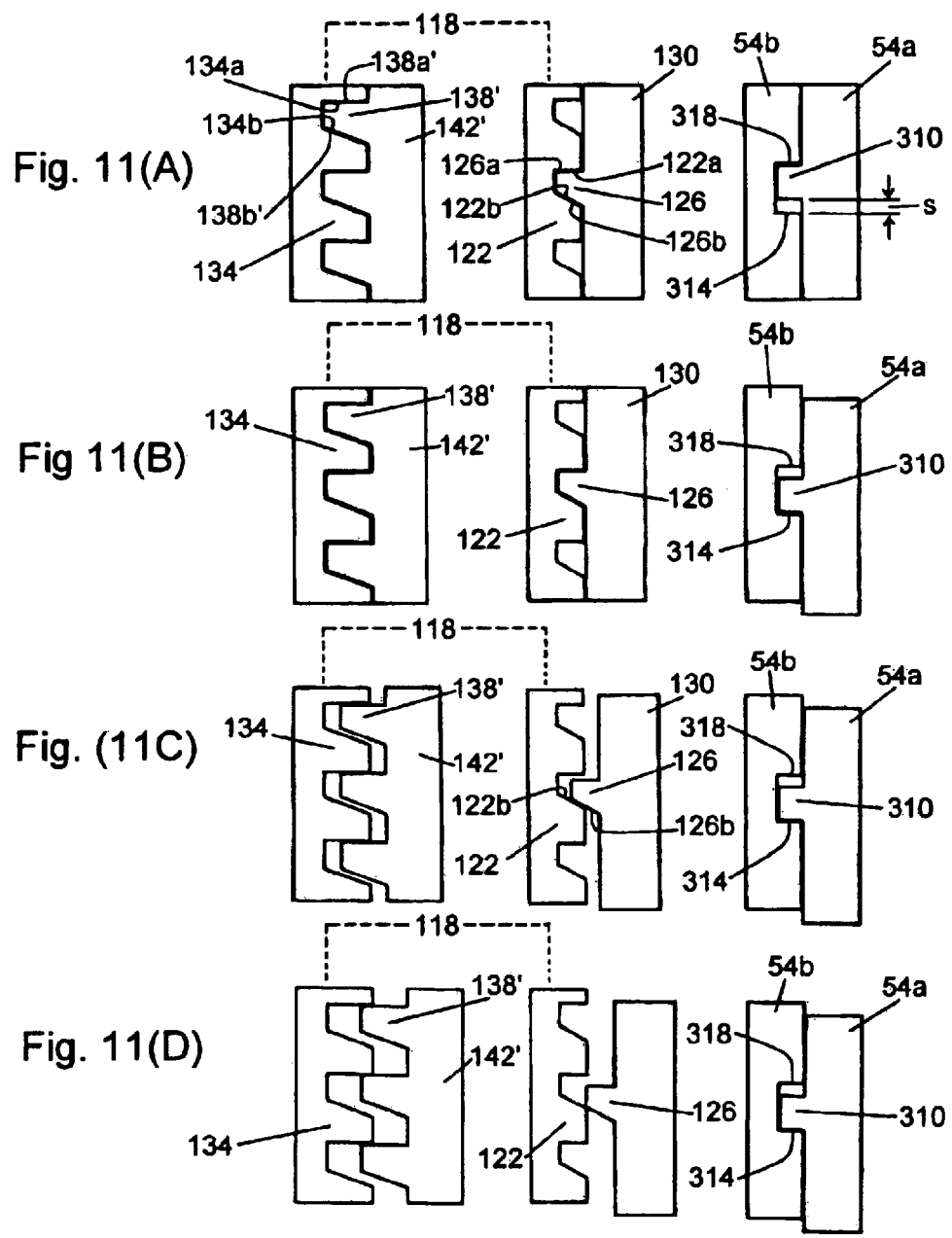

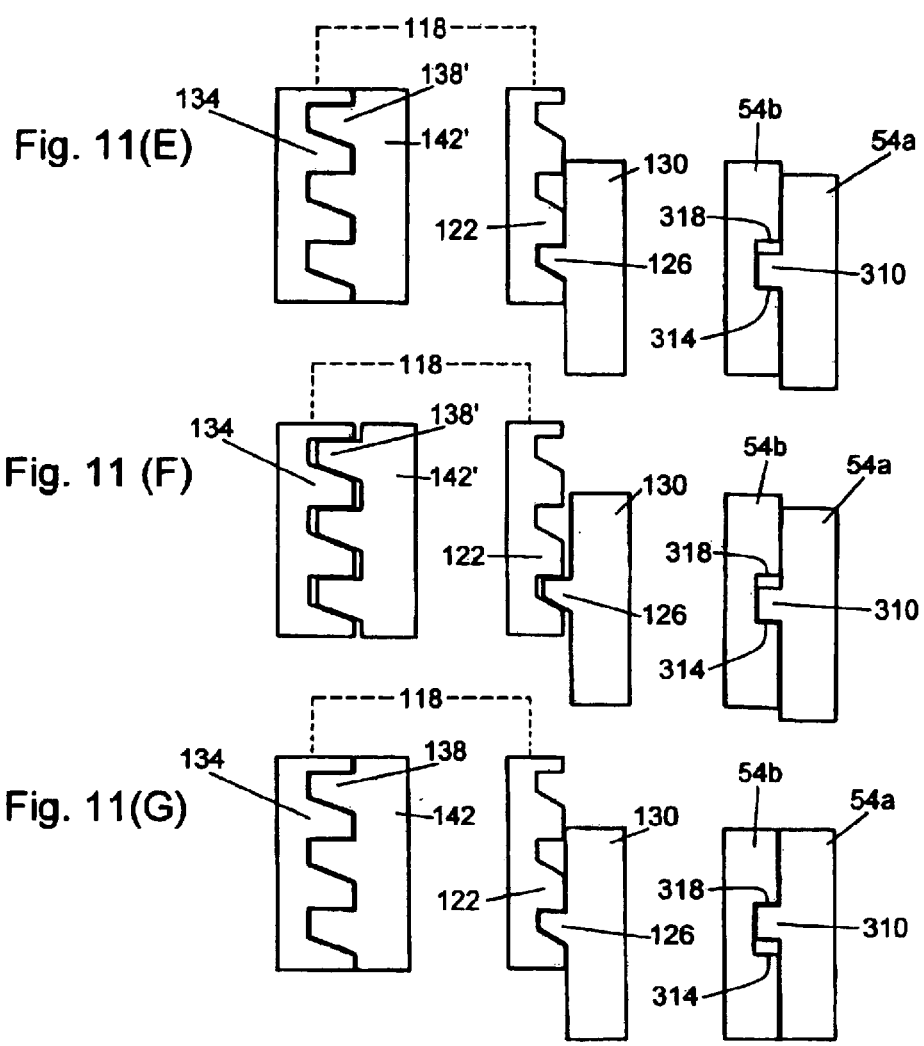

HANDGRIP SHIFTER FOR A BICYCLE

CROSS REFERENCE TO RELATED APPLICATIONS

This application is a division of copending application Ser. No. 10/117,026, filed Apr. 4, 2002.

BACKGROUND OF THE INVENTION

The present invention is directed to control devices for bicycles and, more particularly, to a twist-grip shift control device for shifting a bicycle transmission.

An example of a twist-grip shift control device is shown in U.S. Pat. No. 5,921,139. That shift control device comprises a fixed member that is nonrotatably fixed to the bicycle handlebar, a handgrip operating member rotatably supported relative to the fixed member for rotating in first and second directions, a takeup member rotatably mounted relative to the fixed member for controlling the pulling and releasing of a transmission control element, and an intermediate (position setting) member coupled for rotation with the takeup member. Ratchet teeth are formed on the fixed member and the intermediate member for holding the intermediate member, and hence the takeup member, in a plurality of fixed positions. Additional ratchet teeth are formed on the intermediate member and the handgrip operating member for rotating the intermediate member and the takeup member for pulling and releasing the transmission control element.

Twist-grip shift control devices have long been used to control bicycle transmissions such as derailleurs and internal hub transmissions. In derailleur transmissions, it is sometimes desirable to provide an overshift function when shifting from one sprocket to an adjacent sprocket. When performing this function, the derailleur chain guide temporarily moves the chain beyond the destination sprocket to ensure that the chain has engaged the destination sprocket and then returns the chain into proper alignment with the destination sprocket. JP 1969-26571 and U.S. Pat. No. 5,102,372 both disclose twist grip shifting devices that perform this function. In JP 1969-26571 a spring-biased ball moves within a space to provide the overshift function, whereas in U.S. Pat. No. 5,102,372 a leaf spring moves within a space to provide the overshift function.

SUMMARY OF THE INVENTION

The present invention is directed to a twist-grip shift control device that provides the overshift function in a novel way. In one embodiment of the present invention, a bicycle shift control device comprises a base member; an operating member structured to be mounted around a handlebar so as to rotate in first and second directions around the handlebar; a transmission control member coupled to the operating member and rotatably mounted relative to the base member for pulling and releasing a transmission control element; a first position setting member; a second position setting member structured to rotate with the operating member and to move axially, wherein the second position setting member moves between an engagement position in which the second position setting member engages the first position setting member and a disengagement position in which the second position setting member is disengaged from the first position setting member; a first coupling member that moves in response to rotation of the operating member; and a second coupling member coupled to the second position setting member for engaging the first coupling member so that rotation of the operating member causes rotation of the second position setting member. The first coupling member and the second coupling member are structured so that rotation of the operating member rotates the transmission control member for a selected rotational distance without moving the second position setting member toward the disengagement position.

In another embodiment of the present invention, a bicycle shift control device comprises a first base member having a first coupling member; a second base member having a second coupling member; an operating member structured to be mounted around a handlebar so as to rotate in first and second directions around the handlebar; wherein the first base member and the second base member are structured to move relative to each other in response to rotation of the operating member; a transmission control member coupled to the operating member and rotatably mounted relative to the first base member for pulling and releasing a transmission control element; a first position setting member; second position setting member structured to rotate with the operating member and to move axially, wherein the second position setting member moves between an engagement position in which the second position setting member engages the first position setting member and a disengagement position in which the second position setting member is disengaged from the first position setting member; a third coupling member that moves in response to rotation of the operating member; and a fourth coupling member coupled to the second position setting member for engaging the operating member so that rotation of the operating member causes rotation of the second position setting member. The first coupling member and the second coupling member are structured so that rotation of the operating member rotates the transmission control member and moves the first base member and the second base member relative to each other for a selected distance without moving the second position setting member toward the disengagement position.

BRIEF DESCRIPTION OF THE DRAWINGS

FIGS. 8A–8G are schematic views showing the operation of the twist-grip shift control device when the operating member is rotated in a wire pulling direction;

FIGS. 11A–11G are schematic views showing the operation of the twist-grip shift control device when the operating member is rotated in a first direction.

DETAILED DESCRIPTION OF THE EMBODIMENTS

Figure 1:
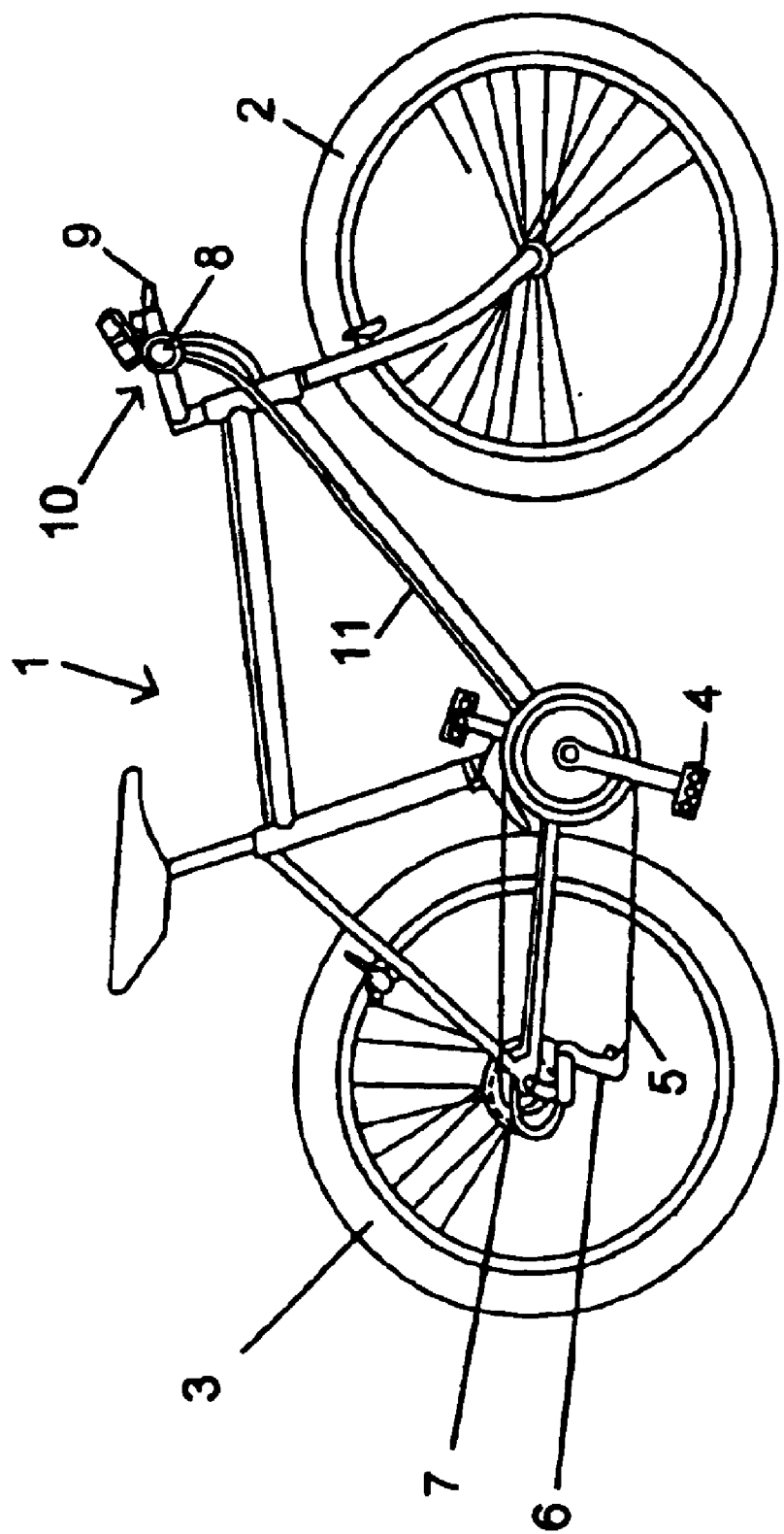
FIG. 1 is a side view of a bicycle which incorporates a particular embodiment of a twist-grip shift control device according to the present invention.

FIG. 1 shows a bicycle 1 provided with a twist-grip shift control device 10 according to the present invention. Bicycle 1 is equipped with a front wheel 2, pedals 4, a derailleur 6 for moving a chain 5 over a sprocket cassette 7 attached to a rear wheel 3, a brake mechanism 9, and the like. Twist-grip shift control device 10 is attached to a handlebar 8 and operates the derailleur 6 via a Bowden-type control cable 11. As used herein, the terms "front direction," "back direction," "transverse direction," and the like refer to the directions with respect to the bicycle. For example, "right" means to the right of the rider sitting on the saddle.

Figure 2:
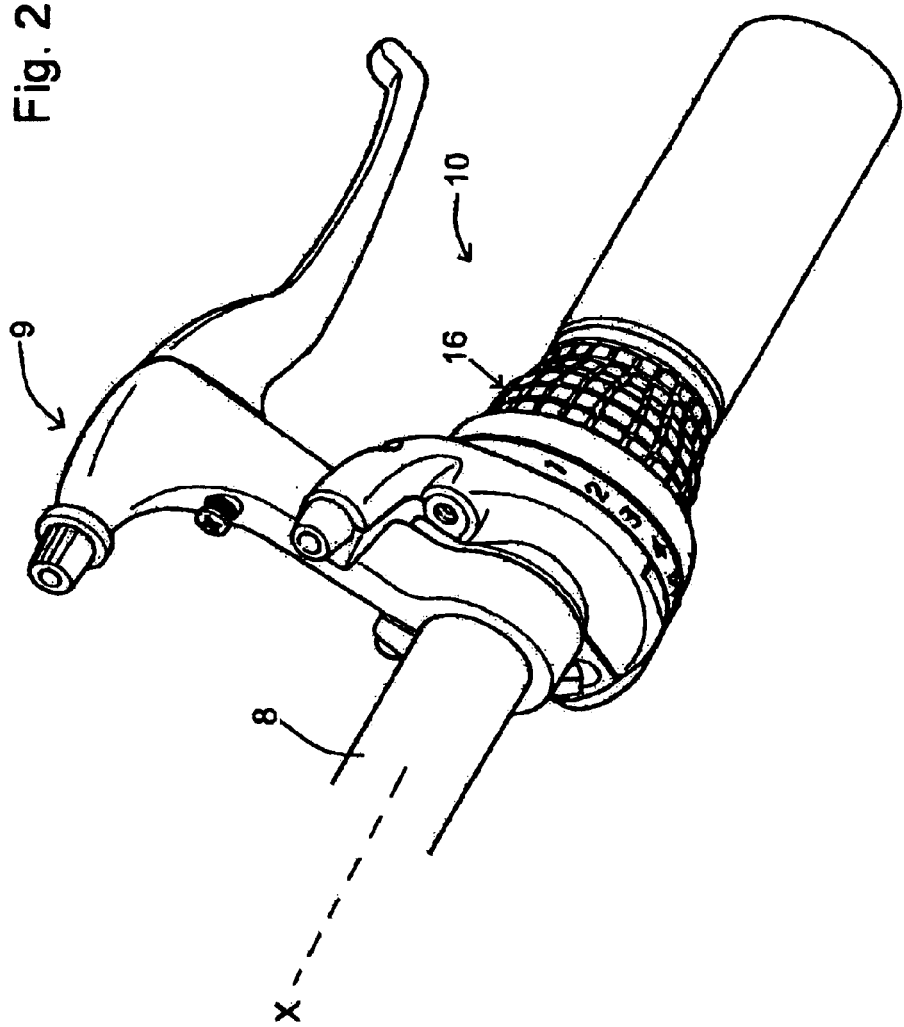
FIG. 2 is an oblique view of a particular embodiment of a twist-grip shift control device according to the present invention.
Figure 3:
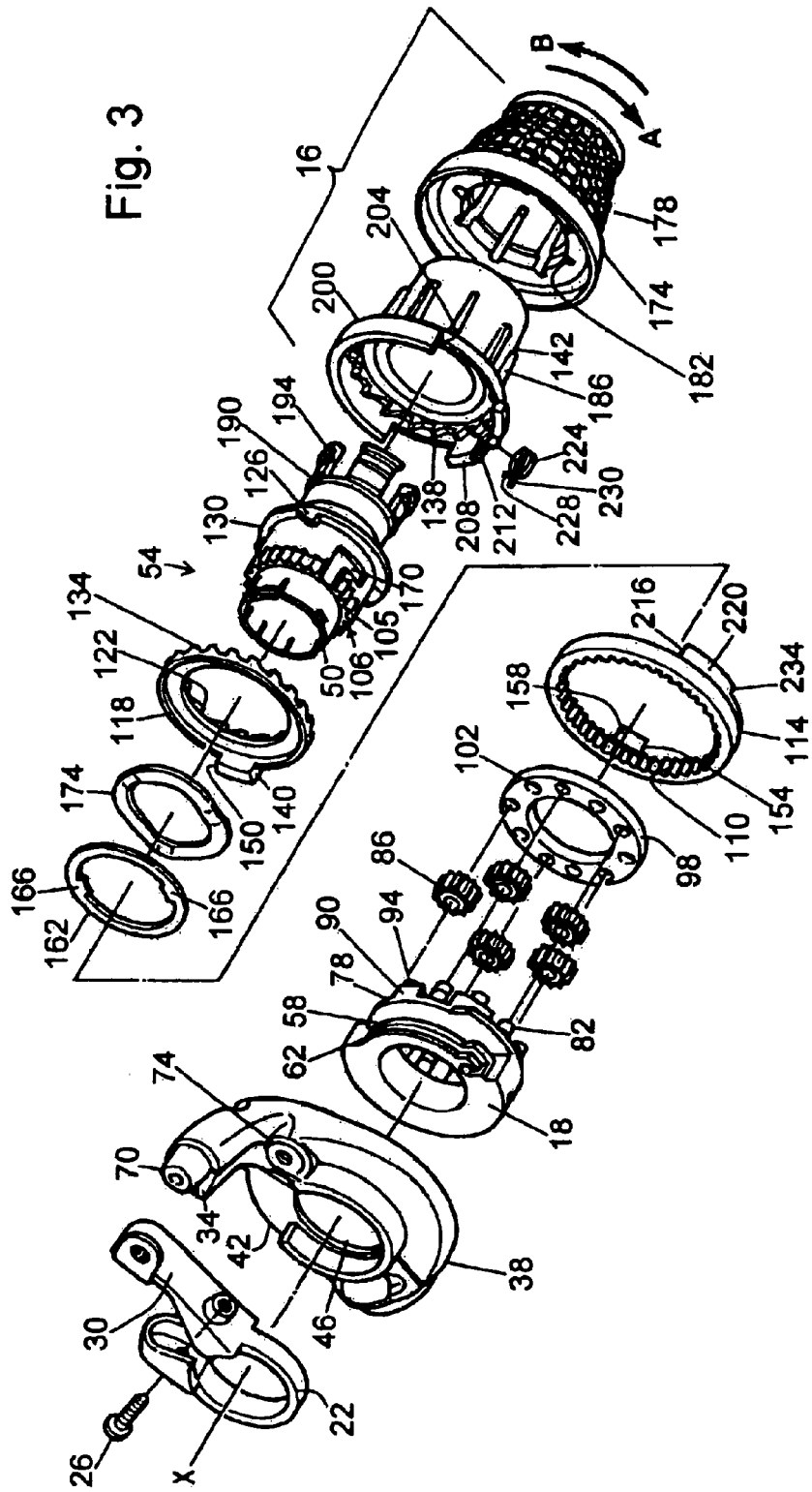
FIG. 3 is an exploded view of the twist-grip shift control device shown in FIG. 2.
Figure 4:
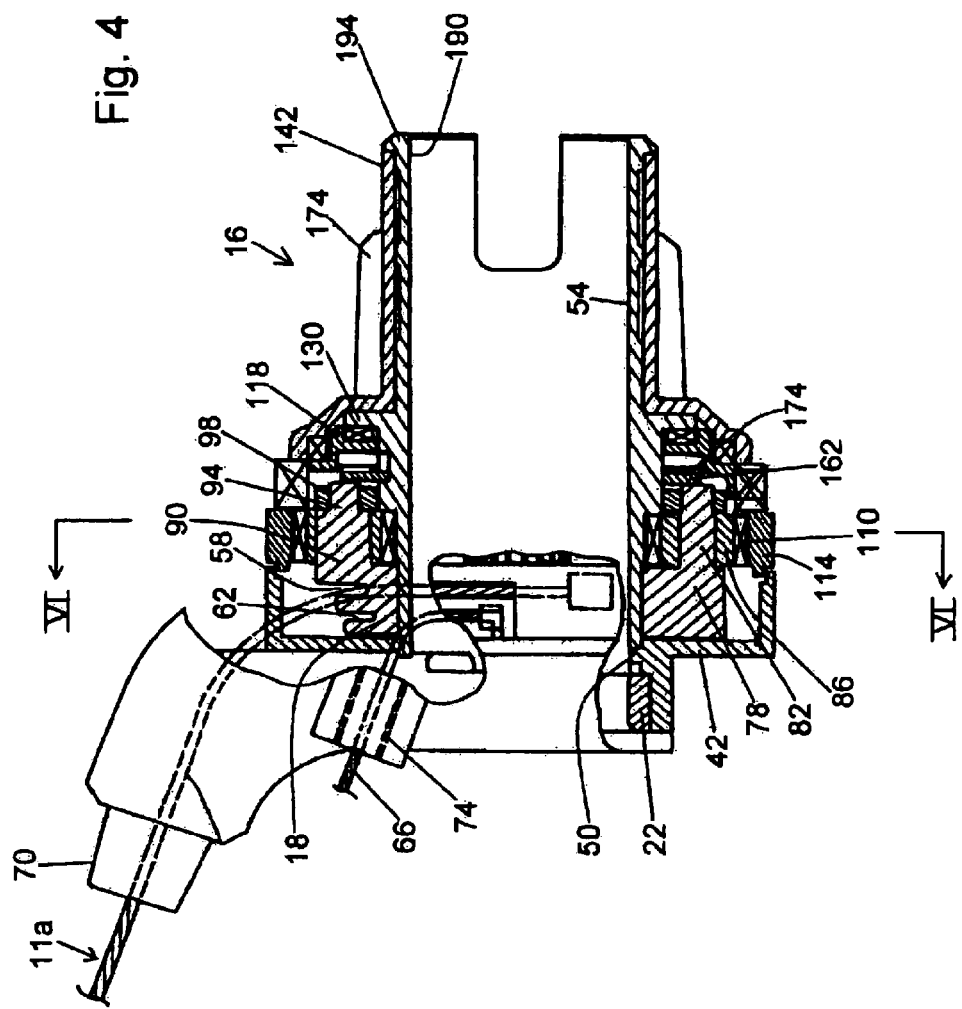
FIG. 4 is a cross sectional view of the twist-grip shift control device shown in FIG. 2.

FIG. 2 is an oblique view of a particular embodiment of shift control device 10 according to the present invention, FIG. 3 is an exploded view of shift control device 10, and FIG. 4 is a cross-sectional view of shift control device 10. In general, rotating an operating member 16 around an axis X that runs along the handlebar 8 rotates a transmission control member in the form of a wire takeup member 18 which, in turn, pulls and releases an inner wire 11a of control cable 11 to operate derailleur 6. In this embodiment, seven-step shifting can be accomplished with shift control device 10, but the number of steps can be varied depending upon the application.

More specifically, shift control device 10 includes a clamping band 22 that is fastened to handlebar 8 with a screw 26 in a conventional manner. Clamping band 22 includes a connecting arm 30 that is fixed to a portion 34 of a housing 38 by a screw (not shown). Housing 38 includes a side wall 42 that defines an opening 46 such that side wall 42 circumferentially fits within a fixing groove 50 formed in one end of a tubular base member 54 that also fits around handlebar 8.

Figure 6:
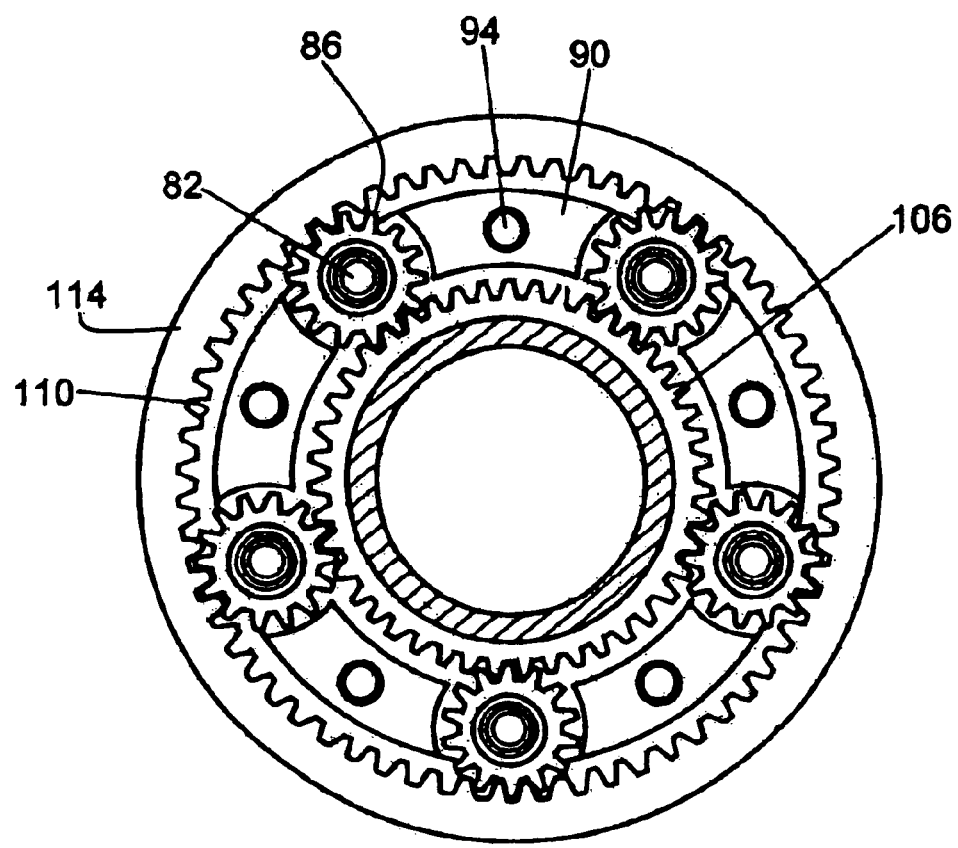
FIG. 6 is a view taken along line VI—VI in FIG. 4.

Wire takeup member 18 is rotatably supported on base member 54, and it includes a wire winding groove 58 for winding and releasing inner wire 11a and another wire winding groove 62 for winding and releasing an auxiliary wire 66 that may be used for controlling some other bicycle device such as a remotely located gear indicator. Inner wire 11a is guided within a channel 70 formed in housing 38, and auxiliary wire 66 is guided within a channel 74 formed in housing 38. Wire takeup member 18 is formed as one piece with a planet gear carrier 78. A shown in FIGS. 3, 4 and 6, planet gear carrier 78 includes a plurality of (e.g., five) pivot shafts 82 for rotatably supporting a corresponding plurality of planet gears 86. Planet gear carrier 78 also includes a plurality of mounting bases 90, wherein each mounting base 90 includes a mounting shaft 94. A cover plate 98 is fitted to planet gear carrier 78 such that cover plate 98 rests against the plurality of mounting bases 90 and each pivot shaft 82 and mounting shaft 94 is press fit within a corresponding opening 102 formed in cover plate 98. Each planet gear 86 meshes with the teeth 105 of a sun gear 106 formed as one piece with the outer peripheral surface of base member 54. Each planet gear 86 also meshes with ring gear teeth 110 formed on the inner peripheral surface of a ring gear 114. It should be readily recognized that sun gear 106, planet gear carrier 78 (and cover plate 98), planet gears 86 and ring gear 114 form a planetary gear mechanism.

An annular position setting member 118 (an example of a second position setting member) is rotatably supported on base member 54, and it includes a plurality of circumferentially disposed position setting (ratchet) teeth 122 (examples of second position setting teeth) for selectively engaging three position setting teeth 126 (examples of a first position setting teeth) evenly spaced circumferentially on a flange 130 (an example of a first position setting member) that extends radially outwardly from and one piece with base member 54, a plurality of circumferentially disposed coupling (ratchet) teeth 134 for selectively engaging a corresponding plurality of coupling (ratchet) teeth 138 circumferentially disposed on an operating member body 142 of operating member 16, and an axially extending coupling tab 140 forming an abutment 150. Abutment 150 contacts an abutment 154 formed on a coupling tab 158 that extends axially from ring gear 114 so that position setting member 118 and ring gear 114 can rotate as a unit. A fixing washer 162 is mounted to base member 54 by coupling tabs 166 that are fitted in L-shaped coupling grooves 170 formed in base member 54 (only one such coupling groove is shown in FIG. 3). A spring washer 174 is disposed between fixing washer 162 and position setting member 118 for biasing position setting member 118 toward flange 130 so that the plurality of position setting teeth 122 firmly engage the position setting teeth 126 formed on flange 130, and the plurality of coupling teeth 134 firmly engage the plurality of coupling teeth 138 formed on operating member body 142.

Figure 5:
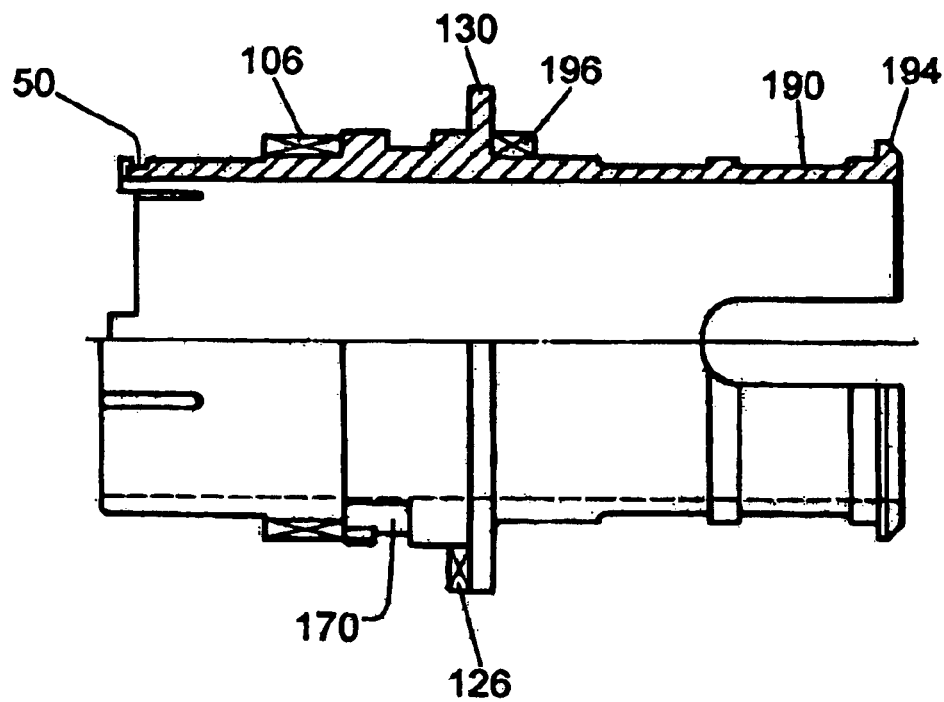
FIG. 5 is a partial cross sectional view of the base member shown in FIG. 3.

Operating member 16 includes operating member body 142 and a gripping cover 174. Gripping cover 174 is formed from an elastic material, and it includes gripping projections 178 circumferentially formed over its outer peripheral surface to facilitate gripping. Gripping cover 174 includes a plurality coupling grooves 182 formed on its inner peripheral surface for engaging a corresponding plurality of coupling projections 186 formed on the outer peripheral surface of operating member body 142 to securely mount gripping cover 174 to operating member body 142. Operating member body 142 is rotatably mounted on base member 54 and axially held in place against flange 130 by fixing tabs 190 on base member 54, each of which includes a radially extending locking projection 194. A circumferential recess (not shown) formed on the inner peripheral surface of operating member body 142 cooperates with a stop projection 196 (FIG. 5) formed on the side of flange 130 opposite position setting teeth 126 to set the range of motion of operating member body 142 and hence operating member 16.

As noted above, operating member body 142 includes a plurality of circumferentially disposed coupling teeth 138 that engage a corresponding plurality of coupling teeth 134 formed on position setting member 118. Operating body 142 further includes an axially extending first drive tab 200 forming an abutment 204 and an axially extending second drive tab 208 forming an abutment 212. Abutment 204 contacts an abutment 216 formed on an axially extending coupling tab 220 on ring gear 114 for rotating ring gear 114 in the direction A shown in FIG. 3. A return spring 224 has a first spring leg 228 contacting abutment 212 on second drive tab 208 and a second spring leg 230 contacting a second abutment 234 formed on coupling tab 220 for biasing ring gear 114 in the direction B shown in FIG. 3.

Figure 7A:
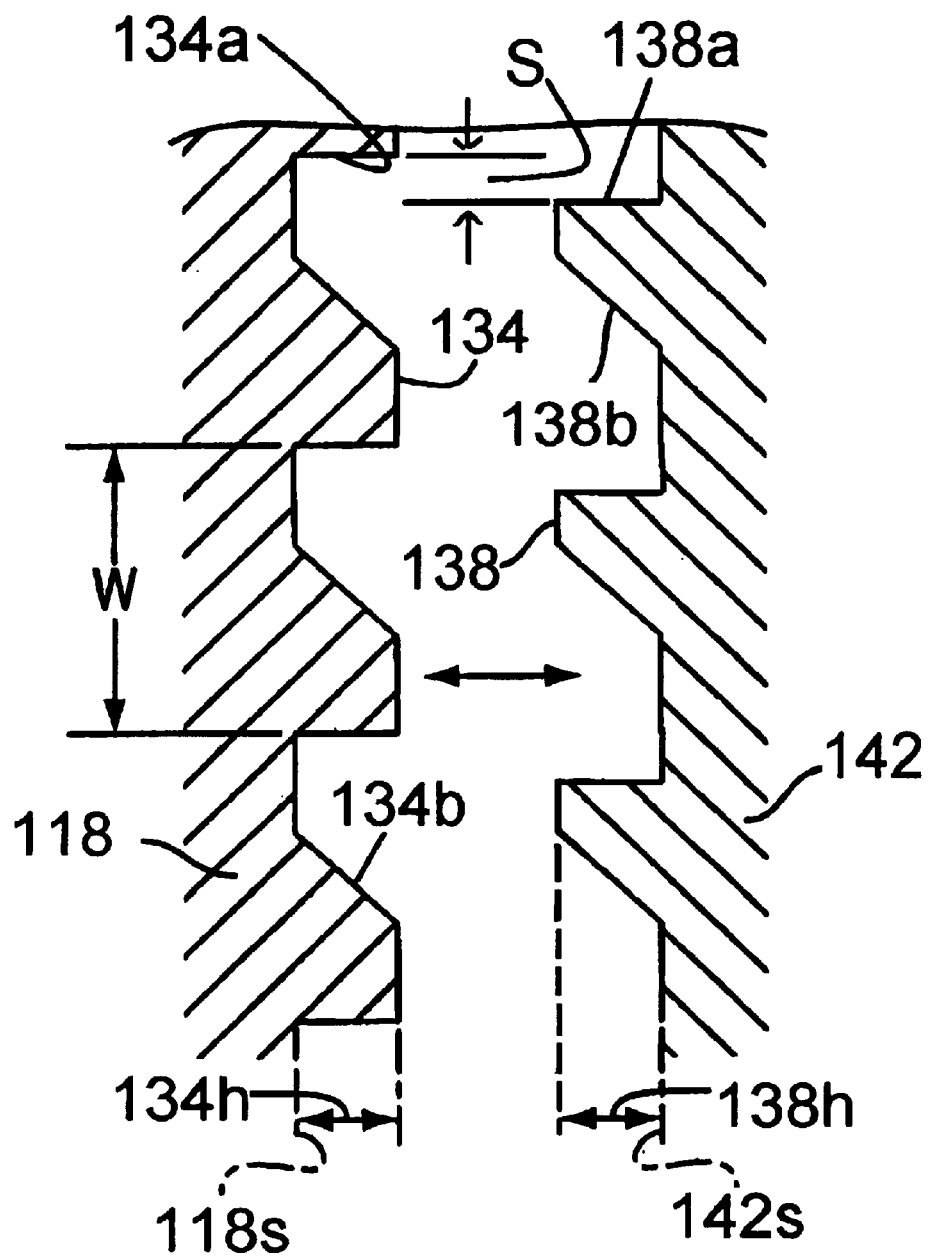
FIGS. 7A and 7B are cross sectional views depicting the shapes of the ratchet teeth of the position setting member, the base member, and the operating member.

As shown in FIG. 7(A), the plurality of coupling teeth 138 on operating member body 142 are provided in a reference plane 142s facing the position setting member 118. The plurality of coupling teeth 138 extend along the axis X away from the reference plane 142s, and the height of each coupling tooth 138 in relation to the reference plane 142s is indicated as 138h. In this embodiment, each coupling tooth 138 is formed as a ratchet tooth having a first ratchet tooth surface 138a and a second ratchet tooth surface 138b that functions as a cam surface in a manner described below. Similarly, the plurality of coupling teeth 134 on position setting member 118 are provided in a reference plane 118s facing the operating member body 142. The plurality of coupling teeth 134 extend along the axis X away from the reference plane 118s, and the height of each coupling tooth 134 in relation to the reference plane 118s is indicated as 134h. In this embodiment, each coupling tooth 134 is formed as a ratchet tooth having a first ratchet tooth surface 134a facing a corresponding first ratchet tooth surface 138a on operating member body 142 and a second ratchet tooth surface 134b that functions as a cam surface in a manner described below. When position setting member 118 is in the position shown in FIG. 4, a space S is formed between first ratchet tooth surface 134a of each coupling tooth 134 and first ratchet tooth surface 138a of each coupling tooth 138. This space S provides the overshift function described below. In this embodiment, space S has a distance of between approximately 1.0 millimeter and 2.0 millimeters. However, since the winding radius of wire takeup member 18 and the gear reduction of the planetary gear mechanism determine the amount of pull of the inner wire 11a, this space will differ for different applications. The width W represents the distance position setting member 118 moves when inner wire 11a is pulled to move derailleur 6 the distance between adjacent sprockets on sprocket cassette 7. Thus, the distance between each coupling tooth 134 corresponds to one speed step.

Figure 7B:
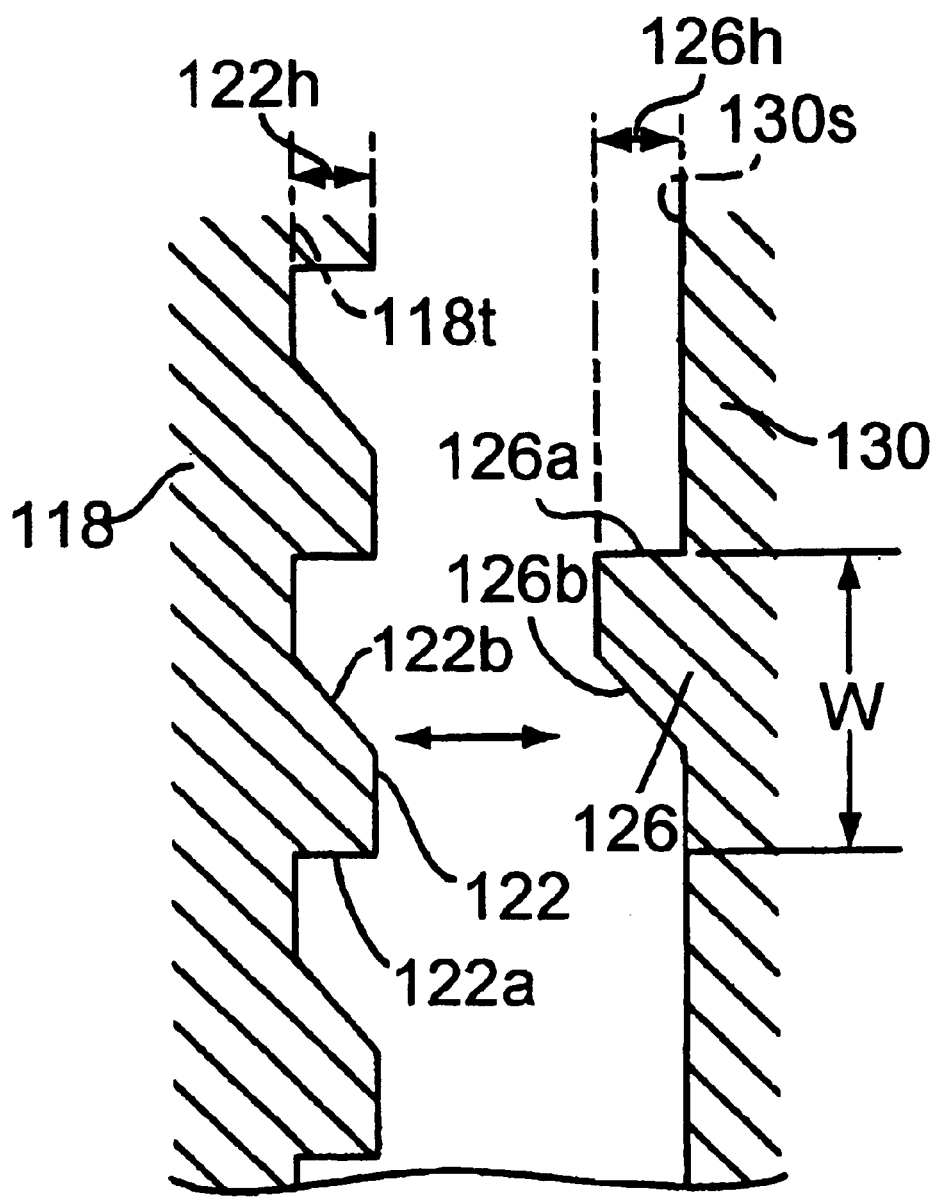

As shown in FIG. 7(B), the position setting teeth 126 on flange 130 are provided in a reference plane 130s facing the position setting member 118. The position setting teeth 126 extend along the axis X away from the reference plane 130s, and the height of the position setting teeth 126 in relation to the reference plane 130s is indicated as 126h. In this embodiment, position setting teeth 126 each are formed as a ratchet tooth having a first ratchet tooth surface 126a and a second ratchet tooth surface 126b that functions as a cam surface in a manner described below. Similarly, the plurality of position setting teeth 122 on position setting member 118 are provided in a reference plane 118t facing the flange 130. The plurality of position setting teeth 122 extend along the axis X away from the reference plane 118t, and the height of each position setting tooth 122 in relation to the reference plane 118t is indicated as 122h. In this embodiment, each position setting tooth 122 is formed as a ratchet tooth having a first ratchet tooth surface 122a and a second ratchet tooth surface 122b that functions as a cam surface in a manner described below.

The operation of shift control device 10 when actuating member 16 is rotated in the direction A will now be described with reference to FIGS. 8(A)–8(G). For the sake of simplicity, the shape of the coupling and position setting teeth will be shown in simplified form. FIGS. 8(A)–8(G) show the teeth disposed in the rear of shift control device 10 when viewed from the front. Thus, the teeth move upwardly when operating member 16 rotates in the direction A.

FIG. 8(A) shows operating member body 142 and position setting member 118 in an idle state before rotation of operating member 16. In this state, the plurality of coupling teeth 134 on position setting member 118 mesh with the plurality of coupling teeth 138 on operating member body 142 such that there is the space S between each first ratchet tooth surface 134a and each first ratchet tooth surface 138a. Position setting teeth 126 similarly mesh with a pair of the plurality of position setting teeth 122 on position setting member 118.

FIG. 8(B) shows the state upon initial rotation of operating member 16. In this state, operating member body 142 has rotated the distance of the space S so that each first ratchet tooth surface 134a contacts its associated first ratchet tooth surface 138a while position setting member 118 has remained stationary. During this time, abutment 204 of first drive tab 200 of operating member body 142 contacts abutment 216 of coupling tab 220 of ring gear 114 to rotate ring gear 114 by the same distance. The rotation of ring gear 114 is communicated to the plurality of planet gears 83, which rotate around the stationary sun gear 106 to cause a corresponding rotation of planet gear carrier 78 and wire takeup member 18 to wind the inner wire 11a.

Figure 8E:
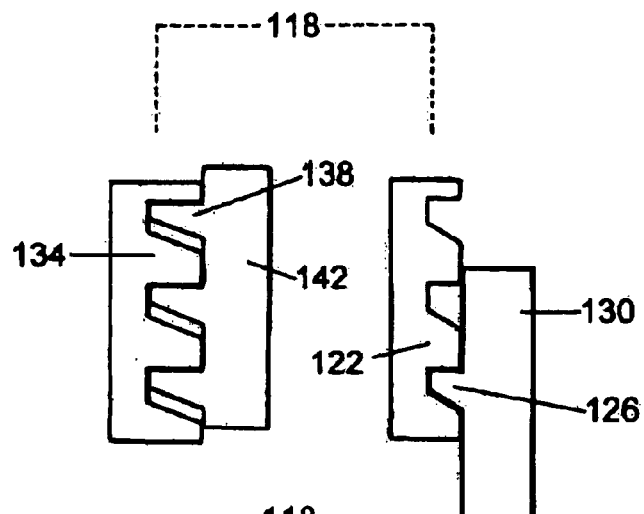
Figure 8F:
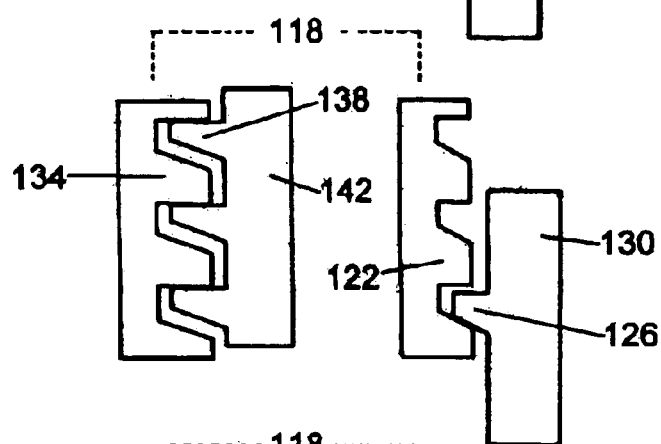
Figure 9:
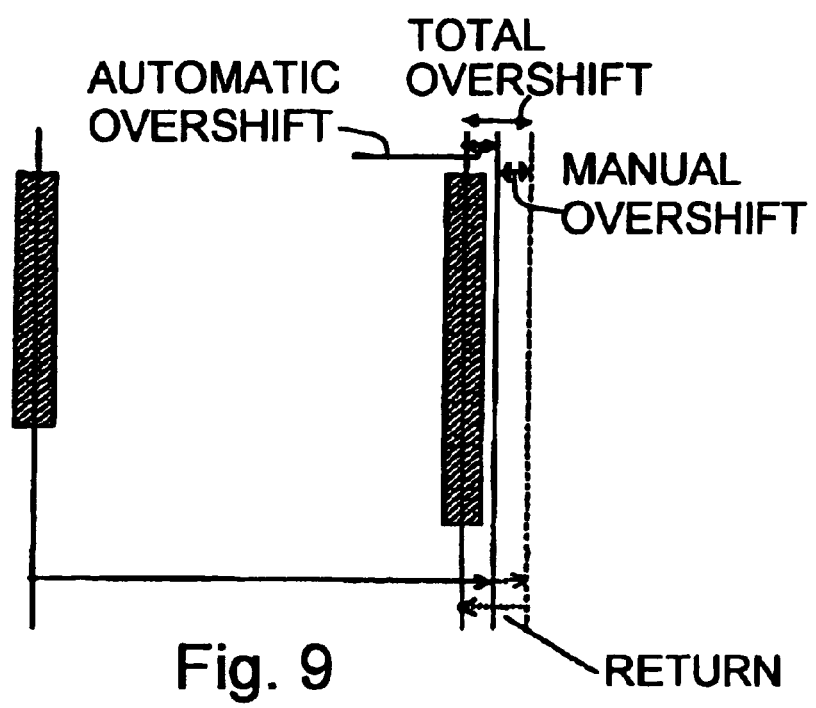
FIG. 9 illustrates an overshift operation according to the present invention.

As shown in FIGS. 8(C) and 8(D), upon further rotation of operating member body 142 the first ratchet tooth surfaces 138a continue to press against the corresponding plurality of second ratchet tooth surfaces 134a, but now position setting member 118 rotates around the axis X. At the same time, a cam surface 122b on a position setting tooth 122 and cam surface 126b on a position setting tooth 126 displace position setting member 118 axially away from flange 130. Further rotation of operating member body 142 in the direction A causes the position setting teeth 122 of position setting member 118 to jump over the position setting teeth of the flange 130 as shown in FIG. 8(E). At this time, the position setting member 118 is again fixed by the position setting teeth 126 of base member 54. However, it should be recalled that because of the original space S between ratchet tooth surface 134a and ratchet tooth surface 138a, operating member body 142 and hence wire takeup member 18 have rotated by more than the amount (W) corresponding to movement of the derailleur from one sprocket to another, so the chain is in the automatic overshift position shown in FIG. 9. If further overshifting is desired, operating member body 142 may be further rotated as shown in FIG. 8(F) to produce additional manual overshift as shown in FIG. 9 without causing a double shift to the next sprocket. That is a benefit of the inclined cam surfaces 122b and 126b in this embodiment.

Because the height 134h of the coupling teeth 134 of position setting member 118 is greater than the height 122h of the position setting teeth 122 of position setting member 118, the coupling teeth 134 of position setting member 118 do not move over the coupling teeth 138 of operating member body 142 and remain captured by the same teeth even when the position setting teeth 122 of position setting member 118 has moved over the position setting teeth 126 of the flange 130. In other words, the meshing relationship of the position setting member 118 relative to the operating member body 142 remains the same throughout the wire pulling operation.

Figure 8G:
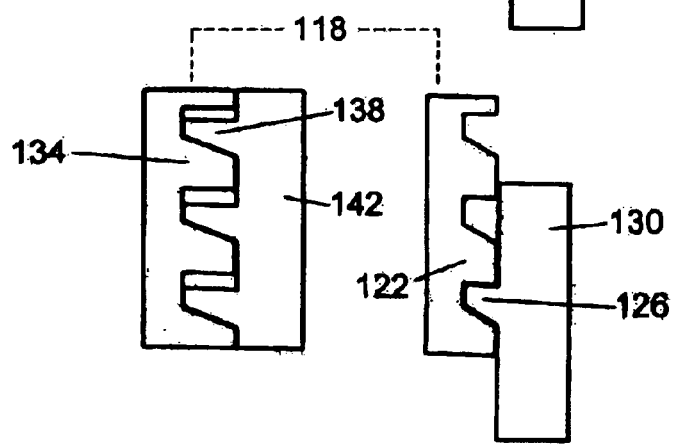

When the rider ceases to rotate operating member 16 in the direction A, operating member body 142 rotates in the direction B as a result of wire tension from derailleur 6 to the position shown in FIG. 8(G) without moving position setting member 118. This, in turn, causes a corresponding rotation of ring gear 114, planet gears 86 and planet gear carrier 18, and wire takeup member 78, thus releasing inner wire 11a enough to remove the automatic and any manual overshift and return the derailleur 6 to a position such that chain 5 is located beneath the destination sprocket as shown in FIG. 9.

When operating member 16 is rotated in the direction B to release inner wire 11a, the ratchet tooth surfaces 138b of operating member body 142 press against the ratchet tooth surfaces 134b of position setting member 118. Since position setting member 118 cannot rotate because of the contact between the ratchet tooth surfaces 122a of position setting teeth 122 of position setting member 118 and the ratchet tooth surfaces 126a of position setting teeth 126 on flange 130, position setting member 118 moves axially away from flange 130 until the position setting teeth 122 jump over position setting teeth 126 (since, as noted above, the height 134h of the coupling teeth 134 of position setting member 118 is greater than the height 122h of the position setting teeth 122 of position setting member 118), and position setting member 118 rotates by one speed step (W). The operation of operating member 16 and position setting member 118 in this direction is the same as disclosed in U.S. Pat. No. 5,921,139. At the same time, second drive tab 208 of operating member body 142 causes return spring 224 to press against abutment 234 on coupling tab 220 of ring gear 114 to rotate ring gear 114 in the direction B. Ring gear 114, planet gears 82, planet gear carrier 78 and wire takeup member 18 rotate accordingly to release inner wire 11a by one speed step.

Figure 10:
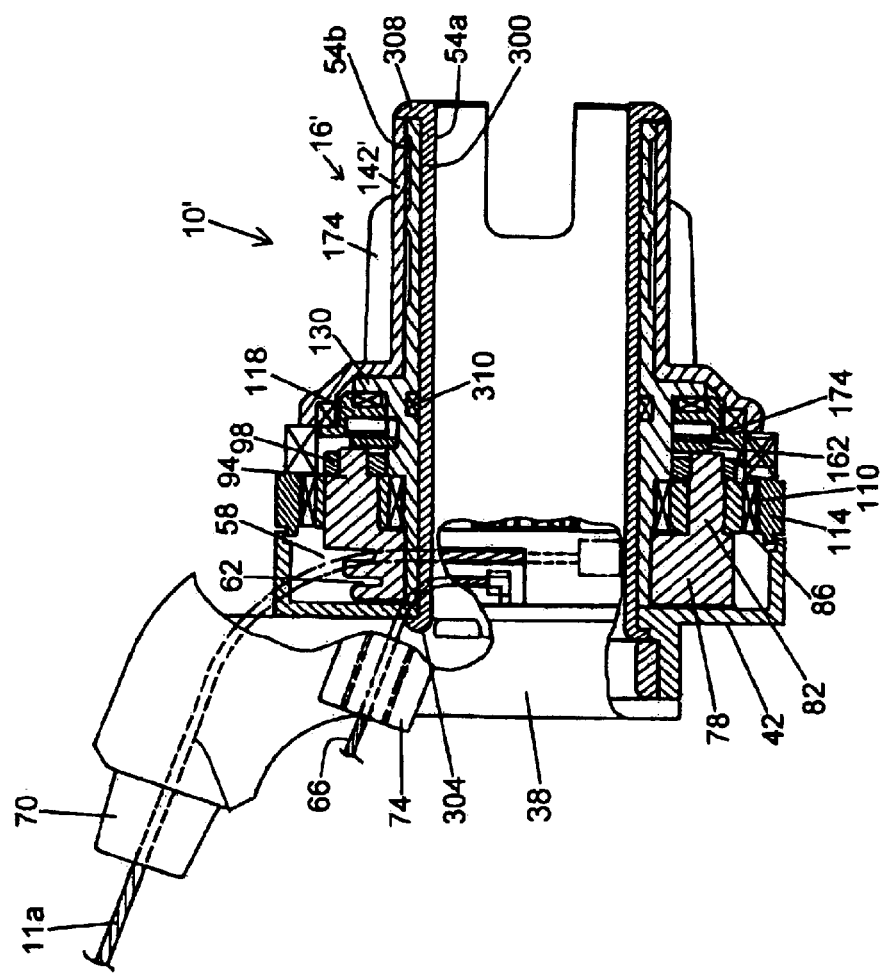
FIG. 10 is a cross sectional view of an alternative embodiment of a twist grip shifting device according to the present invention.

FIG. 10 is a cross sectional view of a twist grip shifting device 10' illustrating an alternative embodiment of the present invention. Many components are the same as in the first embodiment and are likewise numbered the same. Thus, only the differences will be described.

In this embodiment, the coupling teeth 138' (examples of third coupling members or first ratchet teeth) on operating member body 142' are formed such that there is no space between the ratchet tooth surfaces 138a' of coupling teeth 138' of operating member 142' and the ratchet tooth surfaces 134a on the corresponding coupling teeth 134 (examples of third coupling members or first ratchet teeth) on position setting member 118. Instead, base member 54 in the first embodiment is converted into a first base member 54a and a second base member 54b. First base member 54a has a tubular body 300 with radially outwardly extending locking projections 304 for engaging the side wall 42 of housing 38, radially outwardly extending locking projections 308 for axially retaining second base member 54b and operating member body 142' (similar to locking projections 194 in the first embodiment), and a radially outwardly extending first coupling member in the form of a projection 310. Second base member 54b is constructed substantially the same as base member 54 in the first embodiment, except that it is rotatably supported by first base member 54a, and it includes second coupling members in the form of first and second abutments 314 and 318 (FIG. 11(A)) disposed on opposite sides of projection 310 to form a space S similar to space S between ratchet tooth surfaces 134a and 138a in the first embodiment. Second base member 54b is axially retained on first base member 54a by abutting against side wall 42 of housing 38 and by abutting against locking projections 308.

The operation of shift control device 10' when actuating member 16' is rotated in the direction A will now be described with reference to FIGS. 11(A)–11(G). FIG. 11(A) shows operating member body 142', position setting member 118, first base member 54a and second base member 54b in an idle state before rotation of operating member 16'. In this state the plurality of coupling teeth 134 on position setting member 118 mesh with the plurality of coupling teeth 138' on operating member body 142' so that first ratchet tooth surfaces 138a' of coupling teeth 138' of operating member body 142' press against the corresponding plurality of first ratchet tooth surfaces 134a of coupling teeth 134 of position setting member 118, and position setting teeth 126 similarly mesh with corresponding pairs of the plurality of position setting teeth 122 on position setting member 118. Projection 310 of first base member 54a contacts abutment 318 on second base member 54b so that space S is located between projection 310 and first abutment 314.

FIG. 11(B) shows the state upon initial rotation of operating member 16'. In this state, operating member body 142' and second base member 54b have rotated the distance S to close the space between projection 310 and abutment 314 while position setting member 118 has remained stationary. During this time, abutment 204 of first drive tab 200 on operating member body 142' contacts abutment 216 of coupling tab 220 on ring gear 114 to rotate ring gear 114 by the same distance in the same manner as in the first embodiment. The rotation of ring gear 114 is communicated to the plurality of planet gears 83, which rotate around the stationary sun gear 106 to cause a corresponding rotation of planet gear carrier 78 and wire takeup member 18 to wind the inner wire 11a.

As shown in FIGS. 11(C) and 11(D), upon further rotation of operating member body 142', the first ratchet tooth surfaces 138a' of coupling teeth 138' of operating member body 142' continue to press against first ratchet tooth surfaces 134a of coupling teeth 134 of position setting member 118, but now position setting member 118 rotates around the axis X. At the same time, cam surfaces 122b on a position setting teeth 122 of position setting member 118 and cam surfaces 126b on position setting teeth 126 of flange 130 displace position setting member 118 axially away from flange 130. Further rotation of the operating member body 142' in the direction A causes the position setting tooth 122 of position setting member 118 to jump over the position setting tooth 126 of the flange 130 as shown in FIG. 11(E). At this time, position setting member 118 is again fixed by position setting teeth 126 on flange 130 of base member 54b. However, it should be recalled that because of the original space S between projection 310 and abutment 314, operating member body 142', and hence wire takeup member 18, has rotated by more than the amount (W) corresponding to movement of the derailleur from one sprocket to another, so the chain is in the automatic overshift position shown in FIG. 9. If further overshifting is desired, operating member body 142' may be further rotated as shown in FIG. 11(F) to produce the additional manual overshift shown in FIG. 9.

When the rider ceases to rotate operating member 16' in the direction A, operating member body 142' and second base member 54b rotate in the direction B to the position shown in FIG. 11(G) so that projection 310 on first base member 54a abuts against abutment 318 without moving position setting member 118. This, in turn, causes a corresponding rotation of ring gear 114, planet gears 86, planet gear carrier 18 and takeup member 78, thus releasing inner wire 11a enough to remove the overshift and return the derailleur 6 to a position such that chain 5 is located beneath the destination sprocket as shown in FIG. 9.

Operation of shift control device 10' when operating member 16 is rotated in the direction B is substantially the same as in the first embodiment. In this case projection 310 on first base member 54a contacts abutment 318 on second base member 54b for the duration of the shifting operation.

While the above is a description of various embodiments of the present invention, further modifications may be employed without departing from the spirit and scope of the present invention. For example, the size, shape, location or orientation of the various components may be changed as desired. Components that are shown directly connected or contacting each other may have intermediate structures disposed between them. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure.

What is claimed is:

1. A bicycle shift control device comprising:
   a first base member having a first coupling member;
   a second base member having a second coupling member;
   an operating member structured to be mounted around a handlebar so as to rotate in first and second directions around the handlebar;
   wherein the first base member and the second base member are structured to move relative to each other in response to rotation of the operating member;
   a transmission control member coupled to the operating member and rotatably mounted relative to the first base member for pulling and releasing a transmission control element;
   a first position setting member;
   a second position setting member structured to rotate with the operating member and to move axially, wherein the second position setting member moves between an engagement position in which the second position setting member engages the first position setting member and a disengagement position in which the second position setting member is disengaged from the first position setting member;
   a third coupling member that moves in response to rotation of the operating member;
   a fourth coupling member coupled to the second position setting member for engaging the operating member so that rotation of the operating member causes rotation of the second position setting member; and
   wherein the first coupling member and the second coupling member are structured so that rotation of the operating member rotates the transmission control member and moves the first base member and the second base member relative to each other for a selected distance without moving the second position setting member toward the disengagement position.

2. The device according to claim 1 wherein the first coupling member and the second coupling member are structured so that rotation of the operating member rotates the transmission control member for a selected rotational distance without moving the second position setting member.

3. The device according to claim 1 wherein the first coupling member and the second coupling member are structured so that rotation of the operating member rotates the transmission control member for a selected rotational distance without rotating the second position setting member.

4. The device according to claim 1 wherein the first coupling member and the second coupling member are structured so that rotation of the operating member rotates the transmission control member for a selected rotational distance without axially moving the second position setting member.

5. The device according to claim 1 wherein the first coupling member and the second coupling member are spaced apart from each other so that rotation of the operating member rotates the transmission control member for a selected rotational distance without the first coupling member engaging the second coupling member.

6. The device according to claim 5 wherein the first coupling member engages the second coupling member by contacting the second coupling member.

7. The device according to claim 1 wherein the first coupling member rotates with the operating member.

8. The device according to claim 7 wherein the first coupling member and the second coupling member are spaced apart from each other so that rotation of the operating member rotates the transmission control member for a selected rotational distance without the first coupling member engaging the second coupling member.

9. The device according to claim 8 wherein the second position setting member moves when the first coupling member engages the second coupling member.

10. The device according to claim 8 wherein the first coupling member engages the second coupling member by contacting the second coupling member.

11. The device according to claim 10 wherein the first coupling member is one piece with the first base member, and wherein the second coupling member is one piece with the second base member.

12. The device according to claim 9 wherein the first coupling member comprises one of a projection and a first abutment coupled to the first base member, and wherein the second coupling member comprises the other one of the projection and the first abutment coupled to the second base member.

13. The device according to claim 12 wherein the first coupling member comprises the projection coupled to the first base member, and wherein the second coupling member comprises the first abutment coupled to the second base member.

14. The device according to claim 12 further comprising a second abutment spaced apart from the first abutment, wherein the projection is disposed between the first abutment and the second abutment.

15. The device according to claim 14 wherein the third coupling member comprises a first ratchet tooth that moves integrally with the operating member, and wherein the fourth coupling member comprises a second ratchet tooth that moves integrally with the second position setting member.

16. The device according to claim 15 wherein the first ratchet tooth has a first ratchet tooth surface, wherein the second ratchet tooth has a first ratchet tooth surface facing the first ratchet tooth surface of the first ratchet tooth, and wherein the first ratchet tooth surface of the first ratchet tooth contacts the first ratchet tooth surface of the second ratchet tooth when the operating member rotates in the first direction.

17. The device according to claim 16 wherein the first ratchet tooth has a cam surface, wherein the second ratchet tooth has a cam surface contacting the cam surface of the first ratchet tooth, and wherein the cam surface of the first ratchet tooth and the cam surface of the second ratchet tooth cause the second position setting member to move axially away from the operating member when the operating member rotates in the second direction.

18. The device according to claim 14 wherein the first position setting member comprises a first position setting tooth, and wherein the second position setting member comprises an annular member having a second position setting tooth for engaging the first position setting tooth.

19. The device according to claim 18 wherein the third coupling member comprises a first ratchet tooth that moves integrally with the operating member, and wherein the fourth coupling member comprises a second ratchet tooth that moves integrally with the second position setting member.

20. The device according to claim 19 wherein the operating member has a tubular shape, and wherein the third coupling member comprises a plurality of the first ratchet teeth disposed circumferentially around the operating member.

21. The device according to claim 20 wherein the fourth coupling member comprises a plurality of the second ratchet teeth disposed circumferentially around the annular member for engaging the plurality of first ratchet teeth on the operating member.

22. The device according to claim 21 wherein the second position setting member comprises a plurality of the second position setting teeth circumferentially disposed around the annular member.

23. The device according to claim 22 wherein each first ratchet tooth has a first ratchet tooth surface, wherein each second ratchet tooth has a first ratchet tooth surface facing the first ratchet tooth surface of a corresponding first ratchet tooth, and wherein at least one first ratchet tooth surface of a first ratchet tooth contacts the first ratchet tooth surface of its corresponding second ratchet tooth when the operating member rotates in the first direction.

24. The device according to claim 23 wherein each first ratchet tooth has a cam surface, wherein each second ratchet tooth has a cam surface contacting the cam surface of a corresponding first ratchet tooth, and wherein at least one cam surface of a first ratchet tooth and the cam surface of its corresponding second ratchet tooth cause the second position setting member to move axially away from the operating member when the operating member rotates in the second direction.

25. The device according to claim 24 wherein the first position setting member is coupled to the first base member.

26. The device according to claim 25 wherein the first base member has a tubular shape, and wherein the first position setting member comprises a first position setting tooth for engaging at least one of the plurality of second position setting teeth on the second position setting member.

* * * * *